March 13, 1934.    C. J. ECKROAD    1,950,446
AUTOMATIC DEVICE FOR DISSIPATING ENERGY
Filed Jan. 9, 1928    5 Sheets-Sheet 1

INVENTOR.
Carrell J. Eckroad
BY
Rogers, Kennedy & Campbell
ATTORNEYS

March 13, 1934.  C. J. ECKROAD  1,950,446
AUTOMATIC DEVICE FOR DISSIPATING ENERGY
Filed Jan. 9, 1928   5 Sheets-Sheet 2
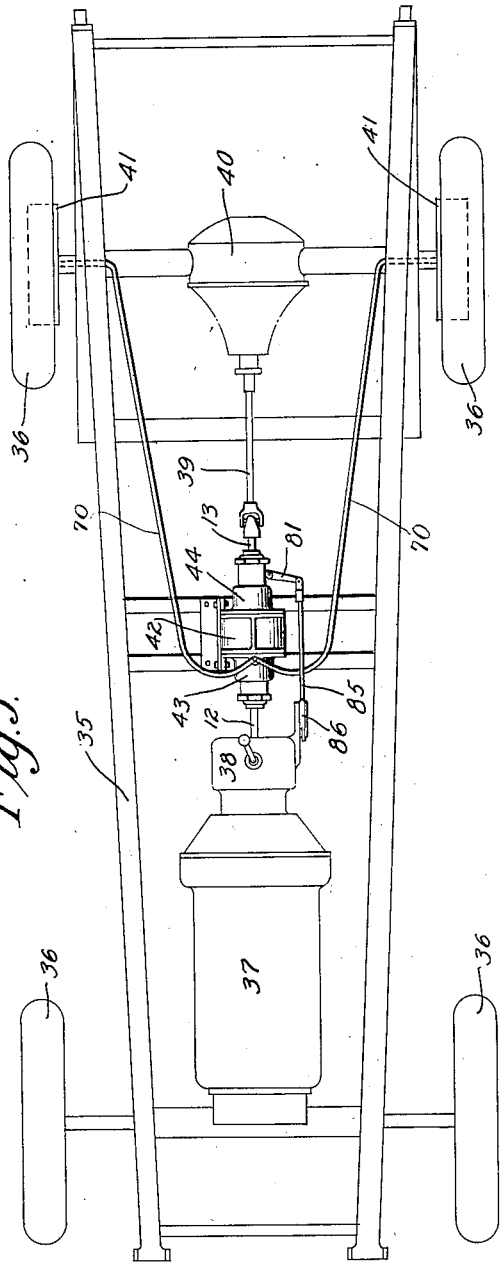
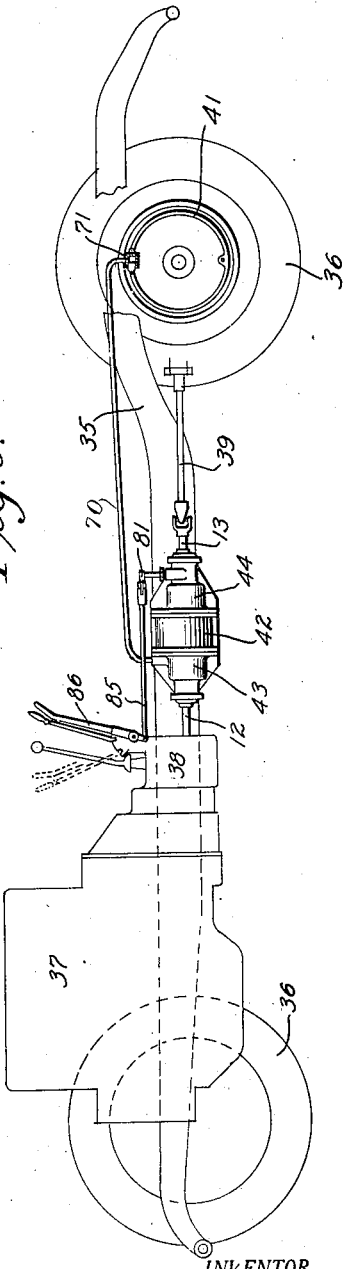
INVENTOR.

March 13, 1934.   C. J. ECKROAD   1,950,446
AUTOMATIC DEVICE FOR DISSIPATING ENERGY
Filed Jan. 9, 1928    5 Sheets-Sheet 3
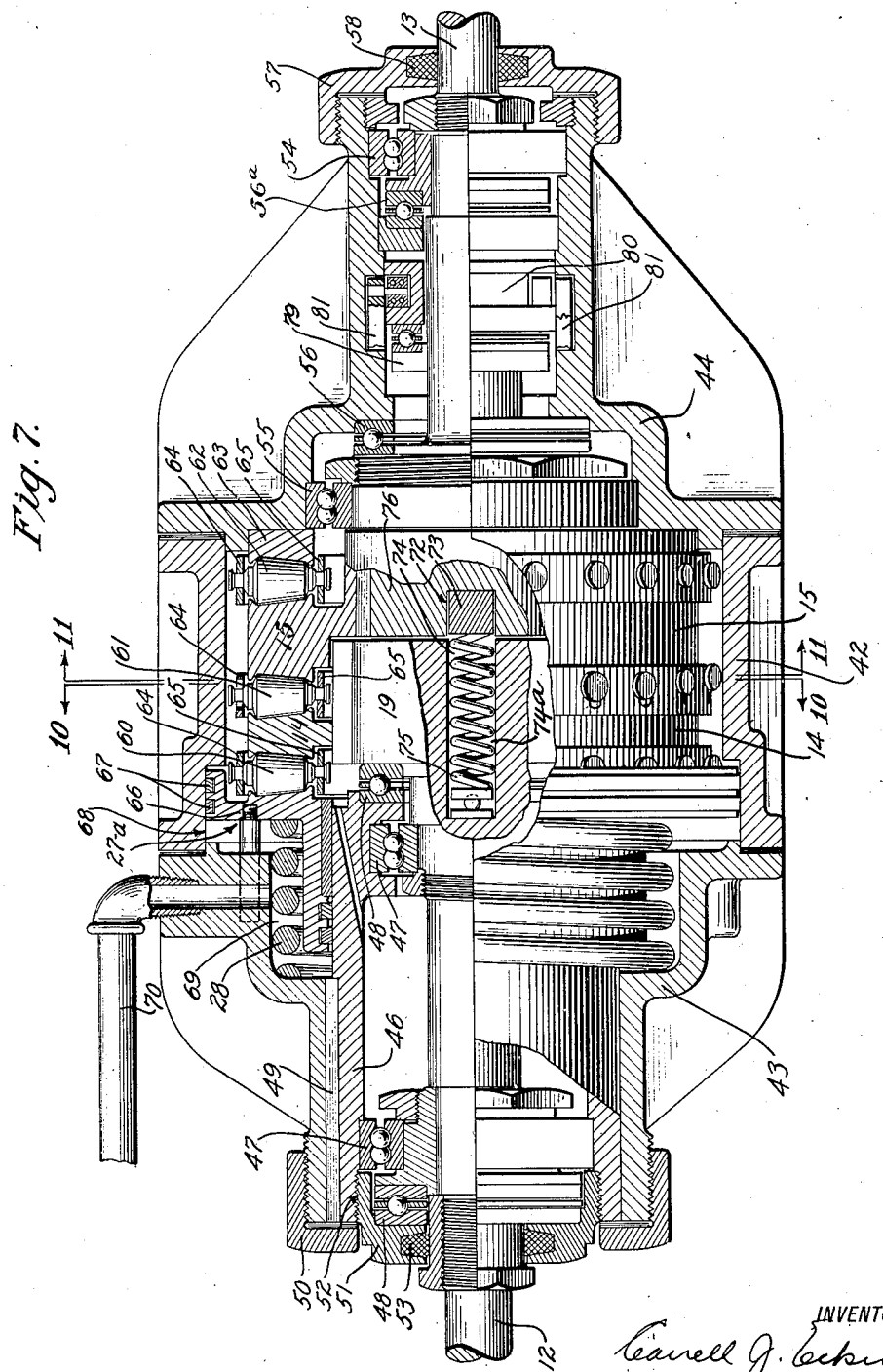

March 13, 1934.   C. J. ECKROAD   1,950,446
AUTOMATIC DEVICE FOR DISSIPATING ENERGY
Filed Jan. 9, 1928   5 Sheets-Sheet 4

INVENTOR.
Carrell J. Eckroad
BY
Rogers, Kennedy & Campbell
ATTORNEYS

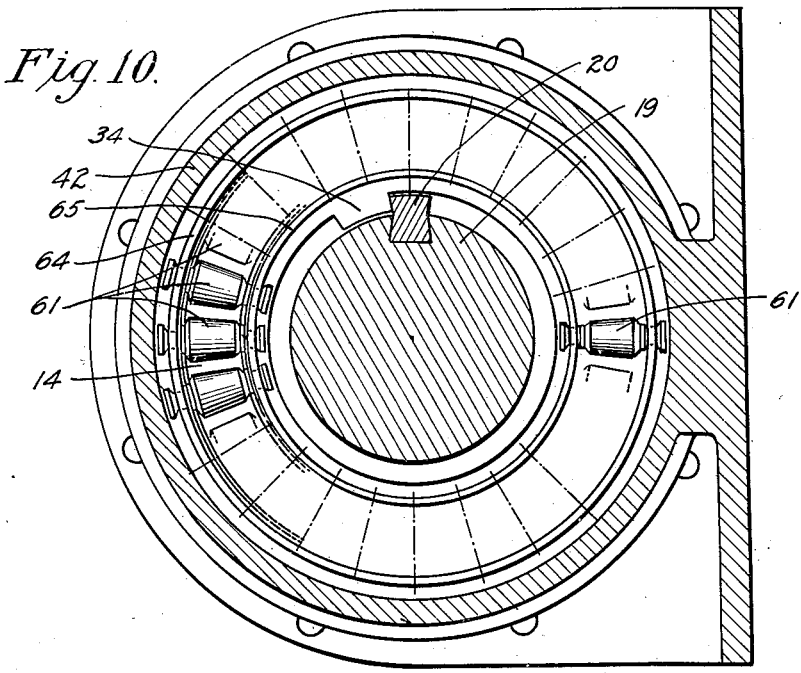
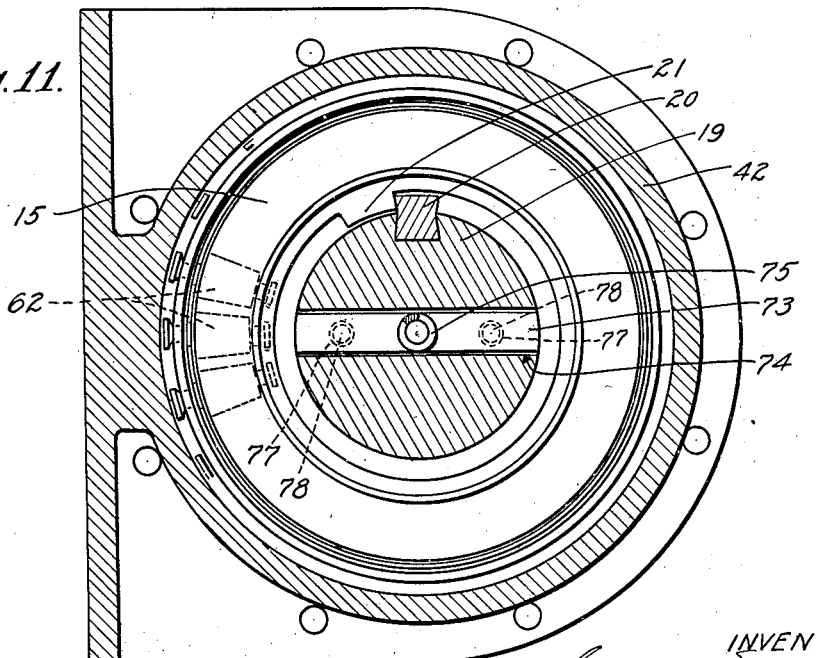

Patented Mar. 13, 1934

1,950,446

UNITED STATES PATENT OFFICE 1,950,446

AUTOMATIC DEVICE FOR DISSIPATING ENERGY

Carrell J. Eckroad, Akron, Ohio

Application January 9, 1928, Serial No. 245,392

18 Claims. (Cl. 188—134)

This invention relates to automatic governors, and refers particularly to governors of kinetic energy specially adapted for use in conjunction with motor vehicles and the like, whereby to overcome the driving torque due to momentum.

In the transmission of power from one mechanical unit to another it frequently happens that, due to variations in operating conditions, the normally driven member actually becomes a driving member tending to run at a higher speed than that imparted to it by the intended driving member or unit. This condition is met particularly in automotive engineering work, especially in motor vehicles, and constitutes a problem which has not been satisfactorily solved prior to this invention. In such vehicles, power is transmitted from a reciprocating engine, electric motor, or the like, through a set of speed changing gears to a propeller shaft, and thence to a rear axle, on which are mounted the traction wheels. Said wheels are normally driven by the engine or other prime mover to propel the vehicle, but under certain conditions said wheels actually generate driving torque, due to inertia, reacting toward the engine.

By way of illustration, the ordinary automobile is cited, wherein, aside from the transmission gearing, the speed is regulated by varying the fuel supplied to the engine. Assuming that the automobile is traveling at a fair rate of speed on a level road, and it is desired to stop or considerably reduce the speed, the fuel supply is first reduced to a minimum and then the brakes are manually applied. As the fuel supply is reduced the number of revolutions per minute of the engine is correspondingly reduced, but due to the inertia of the mass, the vehicle tends to continue at its original speed and until the brakes overcome the momentum, this force reacts back through the power transmission means to the engine. In traveling on a downward grade this effect is still more pronounced, and in any case, such a speed differential subjects the various parts of the engine to considerable strain.

One object of the present invention, in its broader aspects, is to provide an automatic governing device for absorbing or dissipating the kinetic energy generated in or reacting through a power transmission mechanism from sources other than the prime mover.

Other objects of the invention are:—to provide a governing device which is particularly adaptable for use in vehicles whereby to render the same more quickly responsive to speed reduction as controlled by fuel supply to the prime mover; to provide such a device which will eliminate reactive strains in the prime mover; to provide such a device in which the kinetic energy is transferred to the braking system of the vehicle; to provide such a device which will be extremely simple in construction, strong and durable in service, efficient in operation, and a substantial advance in the art.

More specifically the invention contemplates the connection of a driving shaft and a driven shaft, in concentric relation by mutually cooperating cams which are mounted upon the ends of the respective shafts. One of said cams is adapted to move longitudinally with reference to its shaft when there is a speed differential between the two shafts, and such longitudinal movement of one of the cams is resisted by yielding means operating to overcome the speed differential.

In one form of the invention, said longitudinally movable cam operates against the action of a confined compression spring, while in another form of the invention, said movable cam acts against a piston to transmit fluid pressure to brakes associated with the traction wheels. Preferably a plurality of anti-friction elements are employed between the two cams at the opposite surfaces thereof, and the whole mechanism is enclosed in a casing for operative immersion in lubricant and as a protection against dust, flying stones, and other injuries. The novel mechanism may be built up as a complete unit to be interposed in the power transmission system at any desired point, or, for automobile use, it may be built directly into either the transmission case or the rear axle housing.

The foregoing and other objects, features, and advantages will be readily apparent from the following description in connection with the accompanying drawings wherein the invention has been shown by way of illustration, and wherein.

Fig. 5 is a diagrammatic plan view illustrating a modified form of the invention in association with a vehicle chassis;

Fig. 6 is a side elevation thereof;

Fig. 7 is a vertical longitudinal sectional view through the governing unit of Fig. 5, parts being broken away and parts in elevation;

Fig. 10 is a transverse sectional view on line 10—10 of Fig. 7;

Fig. 11 is a transverse sectional view on substantially the same line looking in the opposite direction as indicated by the arrows 11—11.

Figure 1:
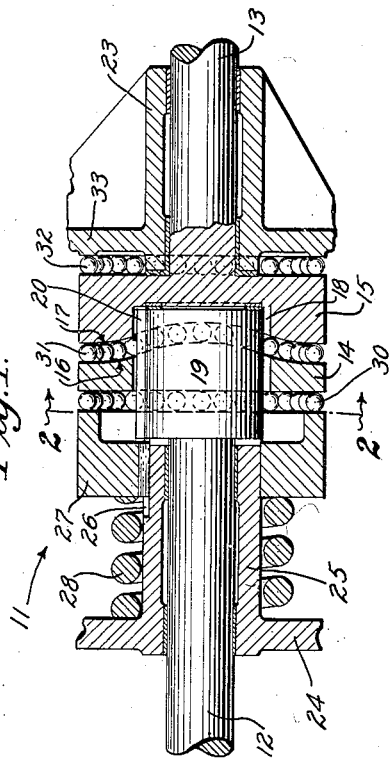
Figure 1 is a vertical longitudinal sectional view through one form of governing device embodying the invention.

In Figs. 1 to 4 inclusive, a simple form of governing device 11 in accordance with this invention has been illustrated in association with a pair of concentric shafts 12 and 13, the former of which is driven by any suitable source of power, while the latter transmits said power to a desired driven unit or machine. The ends of said shafts 12 and 13 are in opposed relation, and are respectively provided with cams 14 and 15 having complementary cam faces 16 and 17 adapted for mutual cooperation. The cam 15 is rigidly secured to or integral with the driven shaft 13 and is provided on its inner end or face with a central recess 18 within which is disposed the end of an enlarged head or collar 19 carried by the driving shaft 12. Said head or collar 19 is of sufficient length to extend through both of the cams and is provided at one of its sides with a longitudinal key 20 extending from its surface. Within the recess 18, the cam 15 is provided with a lug 21 adapted for abutting against one side of the key 20 in such a manner that rotary movement of the driving shaft 12 is communicated to the driven shaft 13, causing both shafts to rotate in unison in a given direction, yet they are capable of relative rotation in the event that the driven shaft should rotate at a higher speed than that of the driving shaft.

A fixed casing 22 is provided for enclosing the cams 14 and 15 and associated parts to be presently described, said casing having a sleeve portion 23 in which the shaft 13 is journaled, and being provided at its other end with a closure plate 24 having an inwardly extending sleeve portion 25 in which the shaft 12 is journaled. Any suitable means may be employed for securing the closure plate 24 to the casing. The sleeve portion 25 has a longitudinal keyway 26 by means of which an annular thrust member 27 is mounted for axial movement toward and away from the cam 15. Said thrust member is normally forced inwardly by a coiled compression spring 28, disposed in a recess 29 in the closure plate 24, such inward movement being limited by the collar 19 on shaft 12. Outward movement of the thrust member against the action of the spring 28 is caused by a corresponding movement of the cam 14. A series of steel balls 30, or similar rolling elements are disposed between and mutually engageable by the adjacent portions of the cam 14 and thrust member 27, and additional balls 31 and 32 are respectively provided between the cams 14 and 15, and between the cam 15 and adjacent end wall 33 of the casing. If desired, said balls 30, 31, and 32 may be supported in suitable cages, not shown. As previously stated, the cam 14 encircles the collar 19 of shaft 12, and is provided on its inner periphery with a lug 34 similar to the lug 21 of cam 15, said lug 34 being adapted for abutting one side of the key 20.

Figure 4:
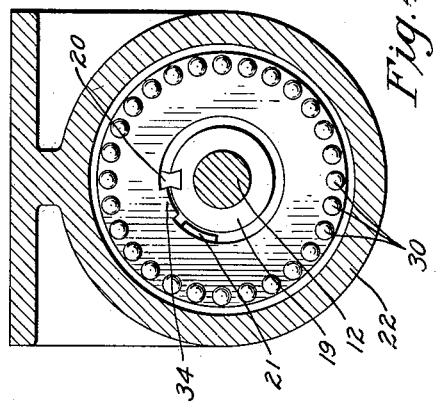
Fig. 4 is a transverse sectional view on line 4—4 of Fig. 3.
Figure 2:
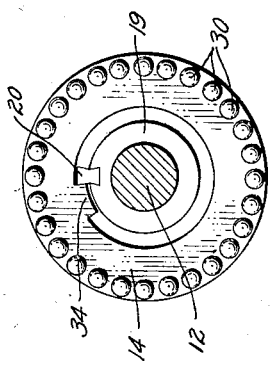
Fig. 2 is a vertical transverse sectional view on line 2—2 of Fig. 1.
Figure 3:
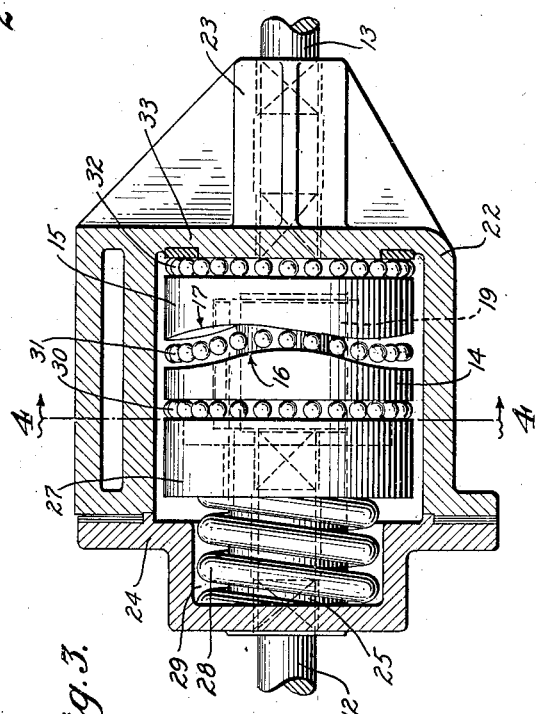
Fig. 3 is a view similar to Fig. 1, showing the parts in a different working relation caused by a speed differential between the two shafts.
Figure 8:
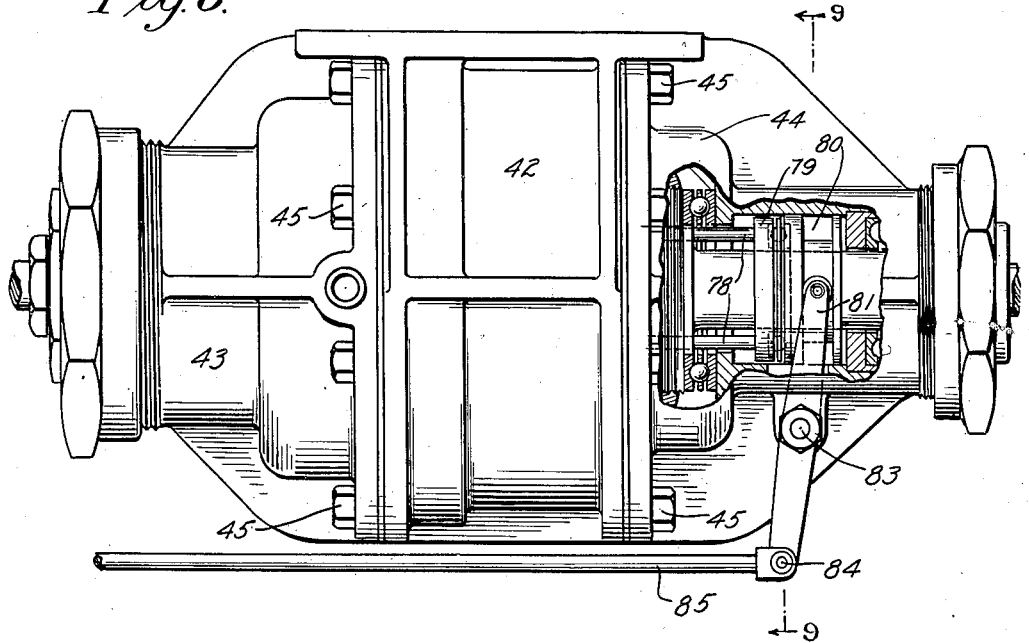
Fig. 8 is a top plan view of the device of Fig. 7, with parts broken away to show the direct drive controlling means.
Figure 9:
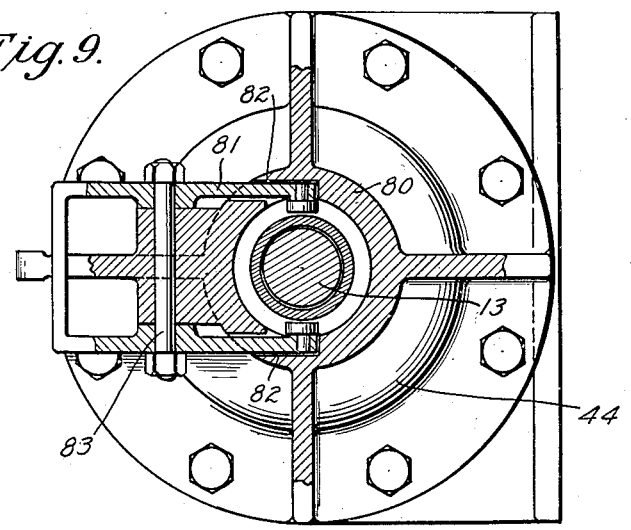
Fig. 9 is a transverse sectional view on line 9—9 of Fig. 8.

Under normal conditions of operation the parts are in relative positions as shown in Figs. 1 and 2, in which condition the shafts 12 and 13 and cams 14 and 15 rotate in perfect synchronism by virtue of the engagement of the key 20 with cam lugs 21 and 34. In the event that some external force reacts upon or through the driven shaft 13 in such a manner as to create a speed differential, with the driven shaft faster than the driving shaft, the cam 15 rotates slightly with reference to the cam 14 and driven shaft 12 as shown in Figs. 3 and 4. Such relative rotation causes the cam 14 and thrust member 27 to be moved axially against the force of the compression spring 28. Since the other end of the spring 28 is fixed against the cover 24, it will be evident that said spring will resist the longitudinal movement of the thrust member 27 and cam 14, thus subjecting the balls and races to a compressive force much greater than the normal end thrust. Within the elastic limits of the materials, this increased compressive force results in surface engagement of the balls, instead of point contact, and induces friction between the relative moving parts, whereby to partly dissipate the energy reacting through the driven shaft 13. The relative arrangement of the parts under a speed differential is shown in Fig. 3, from which it will be apparent that as the high points of the respective cams 14 and 15 approach each other, the space between them tends to become restricted, and have a gripping effect on certain of the balls 31. This tends to resist rotation of the cam 15 with reference to cam 14, and such resistance, coupled with the frictional contact of the balls as above noted, absorbs the kinetic energy, after which the spring 28 will restore the parts to their normal relative positions. Obviously, the frictional resistance can be controlled by variation in the degree of hardness of the balls as compared with their races. It is to be understood also that the resistance to relative rotation can be augmented in other ways.

The device is extremely simple in construction, and effective for the intended purpose, and is entirely automatic in its action. While one important adaptation of the invention is the governing of the speed of automobiles and the like in the manner above pointed out, it may of course be used in other environments, wherever such a controlling units will have utility.

In Figs. 5 and 6, a modified form of the invention is shown applied to an automobile, and the structural details of this modification are illustrated in Figs. 7 to 11, inclusive. The vehicle includes a chassis frame 35 of any ordinary or preferred construction supported on road wheels 36, and having a prime mover 37, such as an internal combustion engine, transmission case 38, and propeller shaft 39, to generate and transmit power to the rear axle 40 to drive the vehicle. Suitable brakes 41 are employed, preferably in association with the driving wheels, to arrest movement of the vehicle, and in this modified form of the invention, the excess kinetic energy due to inertia or momentum reacting from the driving wheels through the propeller shaft is utilized to impose a braking force on the brakes 41. The novel governing device can be mounted as a unit at any point between the prime mover and the driving wheels, but is most conveniently disposed immediately adjacent one end of the propeller shaft. The modified form of the invention shown in Figs. 5 to 11, is essentially the same as that already described, so far as the broad principles and mode of operation are concerned, but it is worked out more elaborately than the first described form and embodies certain additional features.

In this form of the invention, the casing comprises a central section 42 of substantially cylindrical character, and end sections 43 and 44 secured together by cap screws or bolts 45. The driving shaft 12 is rotatably supported in a bearing sleeve 46 carried by the end section 43, said bearing sleeve being fitted with spaced radial bearings 47 and thrust bearings 48. The bearing sleeve 46 is held against rotation by means of a key 49 in the casing section 43, and held against longitudinal movement by a threaded nut 50 on the forward end of said casing section 43. Said nut 50 is centrally apertured for the passage of a gland member 51 which is screwed into the bearing sleeve 46 as indicated at 52, and which is provided with a packing washer 53 to protect the bearings from the entrance of grit or other foreign substances and retain lubricant with which the casing is filled. Said gland member 51 also functions to retain the driving shaft 12 and its bearing races in proper position, as will be evident from Fig. 7. The driven shaft 13 is mounted in radial ball bearings 54 and 55, and thrust bearings 56 and 56ª associated with the casing section 44, the rearward end of which is fitted with a threaded nut 57 having a packing washer 58 encircling a portion of the shaft.

The inner ends of the shafts 12 and 13 are connected by cams 14 and 15, lugs 21 and 34, key 20 and driving shaft head 19 as in the first embodiment, and the bearing sleeve 46 slidably supports a thrust member 27ª which is adapted to be moved through the instrumentality of the cams 14 and 15. In place of the balls 30, 31, and 32, three series of conical rollers 60, 61, and 62 are employed respectively between the thrust member 27ª, cam 14, cam 15, and a fixed race 63, said rollers being articulated in annular series by cage members 64 and 65. The thrust member 27ª is characterized by a body portion 66, which, in effect, is a piston fitted with fluid tight rings 67, and having a snug sliding fit in a fluid cylinder 68 at the front end of the casing section 42. The forward end of said piston 66 engages against the compression spring 28 in a fluid chamber 69 which communicates with the cylinder 68 and is normally filled with any suitable pressure fluid, such as oil, glycerine, or the like. A conduit 70 provides communication between the chamber 69 and the operating cylinders 71 of the wheel brakes 41, and from this it will be evident that as a speed differential between the shafts results in relative rotation of the cams 14 and 15, the piston 66 will displace some of the fluid in the cylinder 68, and said fluid will transmit the resultant pressure to apply the brakes. Thus when the speed of the driving shaft is reduced, the momentum of the vehicle will be in part dissipated by the cam action on rollers 61, and in part transformed automatically to breaking pressure, and the braking forces so transmitted will be in direct proportion to the speed differential. As the speed of the shafts is again equalized, the spring 28 will return the parts to their normal positions.

Under some circumstances it is desirable to render the automatic control means inoperative, and to connect the shafts 12 and 13 for a direct drive. For this purpose, the cam 15 is provided with a transverse recess 72 within which is normally disposed a square key 73. Similarly the rearward extremity of the shaft 12 is provided with a recess or slot 74 into which said key 73 is adapted to be selectively moved, the key then being partly within the slot 74 and partly within the slot 72, locking the two shafts for rotation in unison independently of the cams. A compression spring 75 is seated in a counter-bored hole 74ª centrally in the bottom of the recess 74 and normally forces the key out of said recess 74 and into the recess 72, as shown in Fig. 7. The enlarged inner end 76 of the shaft 13 is provided with diametrically opposed apertures 77 through which spaced parallel rods 78 are slidable, said rods being secured at their forward ends to the key 73, and at their rearward ends to a sliding collar 79. The collar 79 has a peripheral groove 80 for operative connection of a yoke 81, the arms of which extend through openings 82 in the casing section 44. Said yoke is pivoted at 83 and has its outer end connected as at 84 to an operating rod 85, (Fig. 6) the forward end of which is connected to a control lever 86. From this it will be apparent that normally the key 73 is disposed in the recess 72, leaving the cams 14 and 15 and thrust member 27ª free to function automatically, and that by manipulation of the control lever 86 the yoke 81 can be adjusted to slide the collar 79, rods 78, and key 73 longitudinally. The lever 86 may have any desired type of latch whereby to lock it in adjusted position, so that when the connection is made for direct drive, the key 73 will be locked against the action of spring 75. The control means need not necessarily be in the form of the lever 86, since other specific arrangements may be found equally suitable or more so.

From the foregoing it will be evident that a novel governor has been provided for automatically checking the momentum of a moving vehicle or the like, to render the same more responsive to speed changes determined by variations in fuel supply. The device is particularly useful in automobiles when driving in heavy traffic, and can be readily applied to commercial vehicles as an accessory, or built into it by the manufacturer. Obviously, the invention is susceptible of numerous further modifications in the details of construction, combination, and arrangement of parts, and the right is herein reserved to make such changes as fall within the scope of the appended claims without departing from the spirit of the invention.

This application is in part a continuation of the application filed by me August 22, 1924, Serial No. 733,599.

Having thus described my invention, what I claim is:

1. In combination with a driving shaft and a driven shaft coaxially mounted for rotation, opposed face cams carried by the ends of said shafts, one of said cams being movable axially toward and away from the other upon a differential in the rotative speeds of the shafts, and yielding means to resist such axial movement.

2. In combination with a driving shaft and a driven shaft coaxially mounted for rotation, a cam secured to said driven shaft, a second cam rotatable with and axially movable on the driving shaft, said cams being in opposed relation and cooperating to effect axial movement of the second cam on rotation of the driven shaft at a speed higher than that of the driving shaft, and yielding means to resist such axial movement of the second cam whereby to overcome the speed differential.

3. In combination with a driving shaft and a driven shaft coaxially mounted for rotation, opposed cams carried by the ends of said shafts, one of said cams being movable axially toward and away from the other upon a differential in the rotative speeds of the shafts, anti-friction means disposed between and mutually engaged by said cams, and yielding means to resist axial movement of the relatively movable cam whereby to overcome speed differential between the shafts.

4. In combination with a driving shaft and a driven shaft coaxially mounted for rotation, a cam secured to said driven shaft, a second cam rotatable with and axially movable on the driving shaft, said cams being in opposed relation and cooperating to effect axial movement of the second cam on rotation of the driven shaft at a speed higher than that of the driving shaft, yielding means to resist such axial movement of the second cam whereby to overcome the speed differential, and means for connecting the shafts together in a direct drive independently of said cams.

5. In combination with a driving shaft and a driven shaft coaxially mounted for rotation, a cam secured to said driven shaft, a second cam rotatable with and axially movable on the driving shaft, said cams being in opposed relation and cooperating to effect axial movement of the second cam on rotation of the driven shaft at a speed higher than that of the driving shaft, anti-friction elements disposed between and mutually engaged by said cams, and yielding means to resist said axial movement of the second cams whereby to overcome the speed differential between the shafts.

6. In combination with a driving shaft and a driven shaft coaxially mounted for rotation, a cam secured to said driven shaft, a second cam rotatable with and axially movable on the driving shaft, said cams being in opposed relation and cooperating to effect axial movement of the second cam on rotation of the driven shaft at a speed higher than that of the driving shaft, anti-friction elements disposed between and mutually engaged by said cams, and yielding means to resist said axial movement of the second cam whereby to overcome the speed differential between the shafts, and means for connecting the shafts together in a direct drive independently of said cams.

7. In combination with a motor vehicle having a prime mover, traction wheels, and power transmission means including driving and driven shafts, a governor connecting said driving and driven shafts for rotation in unison, said governor having means including a spring-pressed face cam for automatically absorbing kinetic energy transmitted from the traction wheels through said driven shafts.

8. In combination with a motor vehicle having a prime mover, traction wheels, and power transmission means including driving and driven shafts, a governor connecting said driving and driven shafts for rotation in unison, said governor including a pair of opposed cooperating cams respectively associated with said shafts, one of said cams being movable longitudinally on its shaft, and yielding means to resist movement of the movable cam away from the other cam.

9. In combination with a motor vehicle having a fluid pressure brake system, a governor connected in the power transmission system of the vehicle, said governor including means for transmitting power from a driving shaft to a driven shaft, and means for automatically creating braking pressure in the brake system when the driven shaft tends to run ahead of the driving shaft.

10. In combination with a motor vehicle having a fluid pressure brake system, a governor connected in the power transmission system of the vehicle, said governor including means for transmitting power from a driving shaft to a driven shaft, and means for automatically converting torque reacting through said driven shaft into braking pressure in said brake system.

11. In combination with a motor vehicle having a fluid pressure brake system, a governor connected in the power transmission system of the vehicle, said governor including a pair of opposed complementary cams respectively mounted on driving and driven shafts whereby to connect the same for rotation in unison, yet capable of slight relative rotation, one of said cams being longitudinally movable on its shaft, and means actuated by said longitudinally movable cam to apply brake pressure in the brake system.

12. In combination with a motor vehicle having a fluid pressure brake system, a governor connected in the power transmission system of the vehicle, said governor including a pair of opposed complementary cams respectively mounted on driving and driven shafts whereby to connect the same for rotation in unison, yet capable of slight relative rotation, one of said cams being longitudinally movable on its shaft, a pressure fluid cylinder having fluid connection with the brake system, and a piston reciprocable in said cylinder to generate pressure therein, said piston being actuated by said longitudinally movable cam.

13. In combination with a motor vehicle having a fluid pressure brake system, a governor connected in the power transmission system of the vehicle, said governor including a pair of opposed complementary cams respectively mounted on driving and driven shafts whereby to connect the same for rotation in unison, yet capable of slight relative rotation, one of said cams being longitudinally movable on its shaft, a pressure fluid cylinder having fluid connection with the brake system, a piston reciprocable in said cylinder to generate pressure therein, said piston being actuated by said longitudinally movable cam, and a compression spring acting against said piston in opposition to said movable cam.

14. In combination with a motor vehicle having a fluid pressure brake system, a governor connected in the power transmission system of the vehicle, said governor including a pair of opposed complementary cams respectively mounted on driving and driven shafts whereby to connect the same for rotation in unison, yet capable of slight relative rotation, one of said cams being longitudinally movable on its shaft, means actuated by said longitudinally movable cam to apply brake pressure in the brake system, and manually controlled means for connecting the shafts together in a direct drive independently of said cams.

15. In combination with a driving shaft and a driven shaft coaxially mounted for rotation, a pair of opposing face cams coupling said shafts for synchronous rotation in one direction but capable of relative rotation under certain conditions, one of said cams being movable axially upon its shaft whereby to overcome driving torque reacting through the driven shaft.

16. In combination with a driving shaft and a driven shaft coaxially mounted for rotation, a pair of opposing face cams coupling said shafts for synchronous rotation in one direction but capable of relative rotation under certain conditions, one of said cams being movable axially upon its shaft whereby to overcome driving torque reacting through the driven shaft, and a compression spring to resist axial movement of said movable cam away from the other cam.

17. In combination with a driving shaft and a driven shaft coaxially mounted for rotation, a pair of opposing face cams coupling said shafts for synchronous rotation in one direction but capable of relative rotation under certain conditions, one of said cams being movable axially upon its shaft whereby to overcome driving torque reacting through the driven shaft, and anti-friction rolling elements disposed between and mutually engaging the faces of said cams.

18. In combination with a driving shaft and a driven shaft coaxially mounted for rotation, a pair of opposing face cams coupling said shafts for synchronous rotation in one direction but capable of relative rotation under certain conditions, one of said cams being movable axially upon its shaft whereby to overcome driving torque reacting through the driven shaft, anti-friction rolling elements disposed between and mutually engaging the faces of said cams, and yielding means for resisting axial movement of said movable cam away from the other cam.

CARRELL J. ECKROAD.